United States Patent Office 3,208,955
Patented Sept. 28, 1965

3,208,955
EPOXIDE COMPOSITION CONTAINING A STANNIC SALT OF A CARBOXYLIC ACID
William R. Proops, South Charleston, W. Va., assignor to Union Carbide Corporation, a corporation of New York
No Drawing. Filed May 12, 1960, Ser. No. 28,549
12 Claims. (Cl. 260—2)

This invention relates to epoxide compositions and to the curing of certain epoxides with tetravalent tin catalysts.

A variety of catalysts have been suggested for use in promoting the cure or polymerization of epoxide compositions into hardened, infusible and insoluble products of relatively high molecular weight, the cured epoxy compound being either in the form of a homopolymer or copolymer with various organic compounds capable of interaction with the active groups of the epoxide. Included among the known catalysts are strongly acidic materials such as sulfuric acid, phosphoric acid, etc.; aromatic sulfonic acids such as toluenesulfonic acid and benzenesulfonic acid; Lewis acids, e.g., boron trifluoride, stannic chloride, etc.; and boron trifluoride-amine complexes such as boron trifluoride-monoethylamine, boron trifluoride-piperidine, and the like. Although these catalysts are effective for the curing or polymerization process, their use has been handicapped to some extent due to a number of reasons. For example, the use of Lewis acid catalysts such as boron trifluoride suffer the disadvantages of effecting rapid and uncontrolled exotherms during the cure of epoxides to resins, frequently causing thermal decomposition in the composition as evidenced by charring, or expulsion of components as indicated by bubble formation and foaming. A number of these catalysts are of a corrosive nature and cause uncontrollable gel rates in the cure of certain epoxide formulations which thus seriously limits their industrial application in the field of coatings, adhesives, and potting compositions.

The present invention is based on the discovery that tetravalent tin compounds of the class of stannic acylates are especially effective catalysts for promoting the cure of epoxide compositions which contain either a cyclohexene oxide or cyclopentene oxide group. It has been found that the incorporation of stannic acylates in epoxide compounds of the above type provides curable compositions which have a good working life and can be cured at room temperature without incurring rapid gelation or uncontrollable exotherms. The curable compositions can be spread, brushed or sprayed by techniques known in the paint, varnish and lacquer industries, and can be advantageously used in the encapsulation of electrical components. Mixtures of stannic acylate catalysts with epoxides containing the cyclohexene oxide or cyclopentene oxide group offer a distinct advantage over epoxides of the polyglycidyl ether type inasmuch as they can be reacted with various hardeners and foamed by internal development of carbon dioxide or by a blowing agent which vaporizes at or below the temperature of the foaming mass to provide foamed polymers of widely varying and preselected properties. Foamed polymers of this type find wide utility in the field of structural reinforcement and insulation.

The stannic acylates which are used for purposes of the invention are the tetravalent tin salts of aliphatic mono- and dicarboxylic acids which contain from 1 to 54 carbon atoms. The acids can be saturated such as acetic acid, 2-ethylhexanoic, etc., or they may be unsaturated acids such as oleic, linoleic, ricinoleic, and the like.

Examples of specific stannic acylates which can be used include: stannic acetate, stannic propionate, stannic oxalate, stannic tartrate, stannic butyrate, stannic valerate, stannic caproate, stannic caprylate, stannic octoate, stannic 2-ethylhexoate, stannic laurate, stannic palmitate, stannic stearate, and stannic oleate. Of these materials, the preferred catalysts are stannic 2-ethylhexoate and stannic oleate.

The stannic acylates may be made by known methods (H. Schmidt, C. Blohm and G. Jander, Angew. Chem., A 59, 233 (1947)), but a more general method has been developed to produce the stannic acylates of this invention. This method invokes reacting a stannic alkoxide, such as stannic t-amyloxide with a free carboxylic acid to form the corresponding stannic acylate and the corresponding alcohol of the stannic alkoxide. The stannic alkoxides may be made by the method of D. C. Bradley, E. V. Caldwell and W. Wardlaw, J. Chem. Soc., 4775 (1957). The stannic acylates of the higher fatty acids, such as 2-ethylhexoic acid and oleic acid, are liquids and readily miscible with the epoxides to form highly active, curable compositions. These stannic acylates of higher fatty acids are also advantageous catalysts because they are resistant to hydrolysis, and are thus active in the presence of extraneous water in the curable compositions.

The stannic acylate catalysts may be substituted in the hydrocarbon radical with hydroxy, halo and keto, etc., groups.

In carrying out the invention, the stannic catalysts are mixed with epoxides to obtain a homogeneous curable composition. With epoxides that are liquid and viscous, the catalyst can be simply admixed with the epoxide by conventional means as, for example, by stirrers and impellers, etc. When the catalyst and epoxide are immiscible at room temperatures, of if the epoxide is normally solid, the epoxide can be melted or mixed with a liquid organic solvent. Typical solvents include organic ethers such as diethyl ether, methyl propyl ether, etc.; organic esters such as methyl acetate, ethyl propionate, etc.; and organic ketones such as acetone and cyclohexanone, etc.

The amount of catalyst employed will vary with the cure rate desired and the curing temperature employed. As a general guide good results are obtained by utilizing the stannic catalyst in amounts ranging between 0.001 and 20 percent, preferably 0.1 to 10 percent, by weight, based on the total weight of the curable epoxide composition.

The mixture of epoxide composition and catalyst can be cured over a wide temperature range. For example, the catalyst can be added to the epoxide composition at room temperatures, i.e., about 15° C. to 25° C., and the cure effected, or if a rapid cure is desired, the mixture can be heated to temperatures as high as 250° C. or more. Higher temperatures above 250° C. are generally undesirable due to the discoloration which may be induced. Other single curing temperatures and combinations of curing temperatures can be employed as desired.

The stannic catalysts above described are used to promote the cure of a wide variety of known epoxide compositions which contain either a cyclohexene oxide or cyclopentene oxide group, the cured composition produced being in the form of a homopolymer or copolymer with an active organic hardener. The curable epoxide compositions can be monomeric or polymeric, saturated or unsaturated, aliphatic, aromatic or heterocyclic, and can be substituted, if desired, with substituents such as hydroxy, halide, alkyl, aryl, carboxyl, etc.

Specific examples of epoxides which can be cured to provide a variety of useful products are those which contain one or more cyclohexene oxide groups, the term "cyclohexene oxide" referring to the structure:

Among such epoxides are included: aliphatic polyol epoxycyclohexanecarboxylates exemplified by compounds which include 3-methyl-1,5-pentanediol bis(3,4-epoxycyclohexanecarboxylate), 1,5-pentanediol bis(3,4-epoxycyclohexanecarboxylate), 2-methoxymethyl-2,4-dimethyl-1, 5 - pentanediol bis(3,4 - epoxycyclohexanecarboxylate), ethylene glycol bis(3,4-epoxycyclohexanecarboxylate), 2,2-diethyl-1,3-propanediol bis(3,4-epoxycyclohexanecarboxylate), 1,6-hexanediol bis(3,4-epoxycyclohexanecarboxylate), 2-butene-1,4-diol bis(3,4-epoxycyclohexanecarboxylate), 2-butene-1,4-diol bis(3,4-epoxy-6-methylcyclohexanecarboxylate), 1,1,1-trimethylolpropane tris(3,4-epoxycyclohexanecarboxylate), 1,2,3-propanetriol tris(3, 4 - epoxycyclohexanecarboxylate); oxyalkylene glycol epoxycyclohexanecarboxylates exemplified by compounds which include dipropylene glycol bis(2-ethylhexyl 4,5-epoxycyclohexane-1,2-dicarboxylate), diethylene glycol bis(3,4-epoxy-6-methylcyclohexanecarboxylate), triethylene glycol bis(3,4-epoxycyclohexanecarboxylate); epoxycyclohexylalkyl epoxycyclohexanecarboxylates exemplified by compounds which include 3,4-epoxycyclohexyl-methyl 3,4-epoxycyclohexanecarboxylate, 3,4-epoxy-1-methylcyclohexylmethyl 3,4-epoxy-1-methylcyclohexanecarboxylate, 3,4-epoxy-2-methylcyclohexylmethyl 3,4-epoxy-2-methylcyclohexanecarboxylate, (1 - chloro - 3,4-epoxycyclohexan-1-yl)methyl 1-chloro - 3,4 - epoxycyclohexanecarboxylate, (1-bromo-3,4-epoxycyclohexan-1-yl) methyl 1-bromo-3,4-epoxycyclohexanecarboxylate, (1-chloro-2-methyl - 4,5 - epoxy - cyclohexan-1-yl)methyl 1-chloro - 2 - methyl - 4,5 - epoxycyclohexanecarboxylates; epoxycyclohexylalkyl dicarboxylates exemplified by compounds which include bis(3,4-epoxycyclohexylmethyl) pimelate, bis(3,4-epoxy-6-methylcyclohexylmethyl) maleate, bis(3,4-epoxy-6-methylcyclohexylmethyl) succinate, bis(3,4-epoxycyclohexylmethyl) oxalate, bis(3,4-epoxy-6-methylcyclohexylmethyl) sebacate, bis(3,4-epoxy-6-methylcyclohexylmethyl) adipate; epoxycyclohexylalkyl phenylenedicarboxylates exemplified by compounds which include bis(3,4-epoxycyclohexylmethyl) terephthalate, bis(3,4 - epoxy-6-methylcyclohexylmethyl) terephthalate; epoxycyclohexylalkyl oxyalkylene glycol ethers exemplified by compounds which include bis(3,4-epoxy-6-methylcyclohexylmethyl) diethylene glycol ether; sulfonyldialkanol bis(epoxycyclohexanecarboxylates) exemplified by compounds which include 2,2'-sulfonyl-diethanol bis(3,4-epoxycyclohexanecarboxylate); epoxycyclohexane-1,2-dicarboximides exemplified by compounds which include N,N'-ethylene bis(4,5-epoxycyclohexane-1,2-dicarboximide); epoxycyclohexylalkyl carbamates exemplified by compounds which include di(3,4-epoxycyclohexylmethyl) 1,3-tolylenedicarbamate; epoxycyclohexylalkyl acetals exemplified by compounds which include bis(3,4-epoxy-6-methylcyclohexylmethyl) 3,4-epoxy-6-methylcyclohexanecarboxaldehyde acetal; and epoxycyclohexyl-substituted spirobi(meta-dioxane) derivatives exemplified by compounds which include 3,9-bis(3,4-epoxycyclohexyl)spirobi(meta-dioxane). Other epoxide derivatives may be employed, such as vinyl cyclohexene dioxide, vinyl cyclohexene monoxide, 3,4-epoxycyclohexylmethyl acrylate, 3,4-epoxy-6-methylcyclohexylmethyl 9,10-epoxystearate, 1,2-bis(2,3-epoxy-2-methylpropoxy)ethane, and the like.

Other epoxides which can be cured are those which contain one or more cyclopentene oxide groups, the term "cyclopentene oxide" referring to the structure:

Among such epoxides are included bis(2,3-epoxycyclopentyl) ether; dicyclopentadiene dioxide; glycidyl 2,3-epoxycyclopentyl ether; 2,3-epoxycyclopentyl 2-methylglycidyl ether; 2,3-epoxycyclopentyl acrylate; 2,3-epoxycyclopentyl cyclopentyl ether; 2,3-epoxycyclopentyl phenyl ether; 2,3-epoxycyclopentyl 2-cyclopententyl ether; 2,3-epoxycyclopentyl crotonate; allyl 2,3-epoxycyclopentyl ether; 2,3-epoxycyclopentanol; dicyclopentadiene monoxide; ethylene glycol and polyethylene and polypropylene glycol diethers of 2,3-epoxycyclopentanol; and the like.

The epoxides with the stannic catalyst of the type illustrated above can be homopolymerized or copolymerized with an active organic hardener or combination of active organic hardeners. By the term "active organic hardener," as used herein, is meant an organic compound which contains two or more groups which are reactive with epoxy groups. The active organic hardeners illustrated hereinafter are employed in a curing amount, that is, an amount which is sufficient to cause the epoxide system containing the active organic hardener(s) to become polymerized. The active organic hardeners can also be employed in varying amounts so as to give a wide variety of properties to the cured epoxide system. Typical groups which are reactive with epoxy groups are active hydrogen groups such as hydroxyl groups, carboxyl groups, amino groups, thiol groups, and the like; and isocyanate groups, isothiocyanate groups, halide atoms of acyl halides, and the like. Oxydicarbonyl groups such as those contained by polycarboxylic acid anhydrides are also active with epoxy groups. One oxydicarbonyl group will react with two epoxy groups and, in this connection, polycarboxylic acid anhydrides need only contain one oxydicarbonyl group in order to function as an active organic hardener with the epoxide compositions of this invention. Stated differently, one oxydicarbonyl group of an anhydride is equivalent to two epoxy-reactive groups.

Representative active organic hardeners include polyfunctional amines, polycarboxylic acid, polycarboxylic acid anhydrides, polyols, i.e., polyhydric phenols and polyhydric alcohols, polythiols, polyisocyanates, polythioisocyanates, polyacyl halides and others. By the term "polyfunctional amine," as used herein, is meant an amine having at least two active amino hydrogen atoms which can be on the same nitrogen atom or different nitrogen atoms.

Resins having particularly valuable properties can be formed from mixtures containing the epoxide compositions and polyfunctional amines in such relative proportions as provide from 0.2 to 5.0 amino hydrogens of the amine for each epoxy group contained by said epoxide composition. It is preferred to form resins from curable mixtures containing the epoxide compositions and polyfunctional amines which provide from 0.3 to 3.0 amino hydrogens for each epoxy group.

Among the polyfunctional amines contemplated as active organic hardeners include the aliphatic amines, aromatic amines, aralkyl amines, cycloaliphatic amines, alkaryl amines, aliphatic polyamines including polyalkylene polyamines, amino-substituted aliphatic alcohols and phenols, polyamides, addition products of polyamines and low molecular weight epoxides containing oxirane oxygen linked to vicinal carbon atoms, and others.

Typical aliphatic amines include methylamine, ethylamine, propylamine, isopropylamine, butylamine, isobutylamine, 2-ethylhexylamine, 3-propylheptylamine, and the like.

Examples of aromatic amines, aralkyl amines and alkaryl amines include, among others, aniline, o-hydroxyaniline, m-toluidine, 2,3-xylidine, benzylamine, phenethylamine, 1-naphthylamine, meta-, ortho-, and paraphenylenediamines, 1,4 - naphthalenediamine, 3,4 - toluenediamine and the like.

Illustrative cycloaliphatic amines include cyclopentylamine, cyclohexylamine, p-methane - 1,8 - diamine and others.

Among the polyamides, i.e., those having an average molecular weight range from about 300 to about 10,000 include condensation products of polycarboxylic acids, in particular, hydrocarbon dicarboxylic acids such as malonic acid, succinic acid, glutaric acid, adipic acid, dilinolenic acid, and the like, with polyamines, particularly diamines, such as ethylenediamine, propylenediamine and the like.

Aliphatic polyamines include ethylenediamine, propylenediamine, butylenediamine, pentylenediamine, hexylenediamine, octylenediamine, nonylenediamine, decylenediamine, and the like. Polyalkylene polyamines such as diethylenetriamine, triethylenetetramine, tetraethylpentamine, dipropylenetriamine, and the like, are particularly suitable.

The amino-substituted aliphatic alcohols and phenols suitable for use in the present invention are illustrated by 2-aminoethanol, 2-aminopropanol, 3-aminobutanol, 1,3-diamino-2-propanol, 2-aminophenyl, 4-aminophenyl, 2,3-diaminoxylenol, and the like.

Other illustrations of polyfunctional amines are the addition products of polyamines, in particular, diamines and triamines and epoxides containing oxirane oxygen linked to vicinal carbon atoms, such as ethylene oxide, propylene oxide, butadiene dioxide, diglycidyl ether, epoxidized soybean oil, epoxidized safflower oil, and polyglycidyl polyethers, such as those prepared from polyhydric phenols and epichlorohydrin. Particularly useful polyfunctional amines are the mono- and polyhydroxyalkyl polyalkylene and arylene polyamines which can be prepared by the addition reaction of polyalkylene polyamines, arylene polyamines, and the like, e.g., ethylenediamine, propylenediamine, diethylenetriamine, hexamethylenediamine, triethylenetetramine, tetraethylenepentamine, phenylenediamine, methylenedianiline, xylenediamine, and the like, with ethylene oxide or propylene oxide such that the resulting amine adduct contains two or more active hydrogen atoms attached to either one or more amino nitrogen atoms.

Examples of still other polyfunctional amines suitably adaptable include, among others, heterocyclic nitrogen compounds such as piperazine, 2,5-dimethylpiperazine, and the like; aminoalkyl-substituted heterocyclic compounds such as N-(aminopropyl)morpholine, N-(aminoethyl)morpholine, and the like; amino-substituted heterocyclic nitrogen compounds such as melamine, 2,4-diamino-6-(aminoethyl)pyrimidine, and the like; dimethylurea, guanidine, p,p' - sulfonyldianiline, 3,9 - bis(aminoethyl) spirobimetadioxane, hexahydrobenzamide, and others.

Other polyfunctional amines having a total of at least two active amino hydrogen atoms to the molecule can be employed in the epoxide compositions of this invention. For example, such polyfunctional amines as mixtures of p,p' - methylenedianiline and m - phenylenediamine, or other mixtures of two or more polyfunctional amines can be used.

Another class of active organic hardeners which can be reacted with the epoxide compositions above, are the polycarboxylic acids. By the term "polycarboxylic acid," as used herein, is meant a compound or polymer having two or more carboxyl groups to the molecule. Curable mixtures can be formed from the epoxide compositions and polycarboxylic acids, which mixtures can be cured to produce a wide variety of useful products.

Valuable resins can be made from mixtures containing such amounts of an epoxide composition and polycarboxylic acid as to provide 0.3 to 1.25 carboxyl groups of the acid for each epoxy group contained by the amount of the epoxide composition. It is preferred, however, to make resins from curable mixtures which contain such amounts of polycarboxylic acids and epoxide compositions as to provide 0.3 to 1.0 carboxyl groups of the acid for each epoxy groups from the epoxide composition.

Representative polycarboxylic acids include oxalic acid, malonic acid, succinic acid, glutaric acid, adipic acid, pimelic acid, suberic acid, azelaic acid, sebaci acid, alkylsuccinic acids, alkenylsuccinic acids, ethylbutenylsuccinic acid, maleic acid, fumaric acid, itaconic aid, citraconic acid, mesaconic acid, glutaconic acid, ethylidenemalonic acid, isopropylidenemalonic acid, allylmalonic acid, muconic acid, alpha-hydromuconic acid, beta-hydromuconic acid, diglycollic acid, dilactic acid, thiodiglycollic acid, 4-amyl-2,5-heptadienedioic acid, 3-hexynedioic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorophthalic acid, 1,8-naphthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5-benzenetetracarboxylic acid, benzenepentacarboxylic acid, benzenehexacarboxylic acid, polymerized fatty acids derived from natural oils, e.g., linseed oil, tung oil, soybean oil, dehydrated castor oil, etc., including mixtures thereof, which have a molecular weight within the range of 500 to 5000, and the like, such as the dimer and trimer acids of commerce.

Also, as polycarboxylic acids useful in the polymerizable compositions there are included compounds containing ester groups in addition to two or more carboxy groups which can be termed polycarboxy polyesters of polycarboxylic acids, such as those listed above, or the corresponding anhydrides of said acids, esterified with polyhydric alcohols. Stated in other words, by the term "polycarboxy polyesters," as used herein, is means polyesters containing two or more carboxy groups per molecule. These polycarboxy polyesters can be prepared by known condensation procedures, employing mol ratios favoring greater than equivalent amounts of polycarboxylic acid, or anhydride. More specifically, the amount of polycarboxylic acid, or anhydride, employed in the esterification reaction should contain more carboxy groups than are required to react with the hydroxyl groups of the amount of polyhydric reactant.

Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, pentane-1,5-diol, pentane-2,4-diol, 2,2-dimethyltrimethylene glycol, hexane-1,4-diol, hexane-1,5-diol, hexane-1,6-diol, hexane-2,5-diol, 3-methylpentane-1,5-diol, 2-methylpentane-2,5-diol, 3-methylpentane-2,5-diol, 2,2-diethylpropane-1,3-diol, 2,2-diethylhexane-1,3-diol, 2,5-dimethylhexane-2,5-diol, octadecane-1,12-diol, 1-butene-3,4-diol, 2-butene-1,4-diol, 2-butyne-1,4-diol, 2,5-dimethyl-3-hexyne-2,5-diol and the like; trihydric alcohols such as glycerol, trimethylolethane, hexane-1,2,6-triol, 1,1,1-trimethylolpropane, and the ethylene oxide and propylene oxide adducts thereof; tetrahydric compounds such as pentaerythritol, diglycerol, and the like; and higher polyhydric compounds such as pentaglycerol, dipentaerythritol, polyvinyl alcohols and the like. Additional polyhydric alcohols useful in making polycarboxy polyesters can be prepared by the reaction of epoxides, e.g., diglycidyl diethers of 2,2-propane bisphenol, and reactive hydrogen-containing organic compounds, e.g., amines, polycarboxylic acids, polyhydric compounds and the like. In forming the polycarboxy polyesters, it is preferable to use a dihydric, trihydric or tetrahydric aliphatic or oxaaliphatic alcohol. The mol ratios in which the polycarboxylic acid or anhydride can be reacted with polyhydric alcohols in preparing polycarboxylic polyesters useful in the compositions are those which provide polyesters having more than one carboxy group per molecule.

Curable mixtures containing the epoxide compositions and polycarboxylic acid anhydrides can also be employed to produce resins having diversified and valuable properties. Particularly valuable resins can be made from mixtures containing such amounts of polycarboxylic acid anhydride and epoxide compositions as to provide 0.2 to 3.0 carboxy equivalent of the anhydride for each epoxy group of the epoxide composition. It is preferred, however, to make resins from curable mixtures which contain such amounts of polycarboxylic acid anhydride and epoxide composition as to provide 0.4 to 2.0 carboxy equivalent on anhydride for each epoxy group contained by the amount of epoxide concentration.

Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride, hexahydrophthalic anhydride, hexachlorphthalic anhydride, tetrahydrophthalic anhydride, methyltetrahydrophthalic anhydride, tetrachlorphthalic anhydride; hexachloroendomethylene-tetrahydrophthalic anhydride, otherwise known as chlorendic anhydride, tetrabromophthalic anhydride, tetraiodophthalic anhydride; phthalic anhydride, 4-nitrophthalic anhydride, 1,2-naphthalic anhydride; polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in our polymerizable compositions include the Diels-Alder adducts of maleic acid and alicyclic compounds having conjugated double bonds, e.g., methylbicyclo-[2.2.1]heptene-2,3-dicarboxylic anhydride.

Thermoset resins can be prepared from mixtures containing the epoxide compositions and polyols by providing 0.1 to 2.0, preferably from 0.2 to 1.5, hydroxyl groups of the polyol for each epoxy group contained by the amount of the epoxide composition. By the term "polyol," as used herein, is meant an organic compound having at least two hydroxyl groups which are alcoholic hydroxyl groups, phenolic hydroxyl groups, or both alcoholic and phenolic hydroxyl groups. The epoxide composition and polyol can be mixed in any convenient manner. A preferred method, however, is to mix the polyol and epoxide composition in the liquid state so as to obtain a uniform mixture. In forming this mixture, it may be necessary to raise the temperature of the polyol and epoxide composition to at least the melting point or melting point range of the highest melting component. Temperatures below about 150° C. are preferred so as to avoid possible premature curing of these curable mixtures. Stirring also aids the formation of a homogeneous mixture.

Representative polyols include ethylene glycol, diethylene glycol, polyethylene glycols, propylene glycol, dipropylene glycol, polpropylene glycols, trimethlene glycols, butanediols, pentanediols, 12,13-tetracosanediol, glycerol, polyglycerols, pentaerythritol, sorbitol, polyvinyl alcohols, cyclohexanediols, inositol, dihydroxytoluenes, resorcinol, catechol, bis(4-hydroxyphenyl)-2,2-propane, bis(4-hydroxyphenyl)methane, and the ethylene and propylene oxide adducts thereof, etc.

The stannic acylate catalysts of this invention are particularly effective in accelerating the reaction of the epoxides with polyhydric phenols, such as the bisphenols referred to above as well as novolaks and resole phenolic resins.

The following examples illustrate the best mode now contemplated for carrying out the invention.

In the following examples the examination or description of the resins were conducted at room temperature, i.e., about 22° C. Barcol hardness values were determined by the use of Barcol Impressor GYZJ–934–1 at room temperature.

EXAMPLES 1–18

In the following examples, various proportions of 3,4-epoxy - 6-methylcyclohexylmethyl 3,4-epoxy-6-methylcyclohexanecarboxylate were mixed with stannic octoate and acetate catalyst and various active organic hardeners.

Table I

| Ex. No. | Epoxide, gms. | Hardener Name | Hardener Gms. | Stannic octoate, gms. | Stannic acetate, gms. | Ratio [a] | Gel time at ° C. | 150° C. cure, hrs. | Barcol [b] | Remarks |
|---|---|---|---|---|---|---|---|---|---|---|
| 1 | 20 | 1,2,6-hexanetriol | 2.92 | 0.23 | | 1:0.5 | 6–20 hrs. at 150° C. | 20 | 0 | |
| 2 | 20 | do | 2.92 | | 0.12 | 1:0.5 | | 20 | 0 | Liquid at 150° C. but solid at room temp. |
| 3 | 20 | do | 2.92 | | | 1:0.5 | | 20 | | Liquid at room temp. |
| 4 | 16.6 | Bisphenol-A | 6.25 | 0.23 | | 1:0.5 | 0–1 min. at 100–150° C. | 22 | 46 | Upon adding cat. to mixture at 100° C., mixture exothermed. |
| 5 | 16.6 | do | 6.25 | | 0.12 | 1:0.5 | 0.1 min. at 150° C. | 22 | 5 | |
| 6 | 16.6 | do | 6.25 | | | 1:0.5 | 6–22 hrs. at 150° C. | 22 | 0 | |
| 7 | 15.7 | Methyl nadic anhydride [c] | 7.3 | 0.23 | | 1:1 | 4–10 mins. at 27–120° C. | 22 | 35 | |
| 8 | 15.7 | do | 7.3 | | 0.12 | 1:1 | 20–50 mins. at 150° C. | 22 | 38 | |
| 9 | 15.7 | do | 7.3 | | | 1:1 | 4–22 hrs. at 150° C. | 22 | 32 | |
| 10 | 14.7 | Tolylenediisocyanate | 7.3 | 0.23 | | 1:1 | 20–40 mins. at 150° C. | 20 | 30 | |
| 11 | 14.7 | do | 7.3 | | 0.12 | 1:1 | 0–66–1.0 hrs. at 150° C. | 20 | 30 | |
| 12 | 14.7 | do | 7.3 | | | 1:1 | 6–20 hrs. at 150° C. | 20 | | |
| 13 | 17.3 | Sebacic acid | 5.7 | 0.23 | | 1:0.5 | 0–5 mins. at 150° C. | 20 | 34 | |
| 14 | 17.3 | do | 5.7 | | 0.12 | 1:0.5 | do | 20 | 29 | |
| 15 | 17.3 | do | 5.7 | | | 1:0.5 | 10–15 mins. at 150° C. | 20 | 0 | |
| 16 | 11.5 | Dimer acid [d] | 11.5 | 0.23 | | 1:0.5 | 5–10 mins. at 150° C. | 22 | | |
| 17 | 11.5 | do | 11.5 | | 0.12 | 1:0.5 | do | 22 | | |
| 18 | 11.5 | do | 11.5 | | | 1:0.5 | 6.5–22 hrs. at 150° C. | 22 | | |

[a] Ratio of epoxide to reactive or functional group.
[b] Barcol Impressor GYZJ934-1 used to determine Barcol No.
[c] Methylbicyclo-[2.2.1] heptene-2,3-dicarboxylic anhydride.
[d] Emery Empol 1022 Dimer Acid; 578 mol. wt., neutralization equivalent=300.

The procedure for testing the stannic acylates with the epoxide and various hardeners, as summarized in Table I, was as follows: In general, the epoxide and hardener were mixed at room temperature, warmed to the minimum temperature necessary for solution to occur, and catalyst added. However, in experiments 1, 2, 5 and 8, the catalyst was dissolved in the hardener first and then the epoxide added. Because of the nature of the stannic acetate, this procedure was usually necessary with this high melting solid. After bringing the contents of the tubes to 150° C., the tubes were closed and placed in the oven at this temperature. In every case, the catalysts caused the liquid mixtures to gel more rapidly (or give more viscous liquids) and produce harder resins than the controls. In all experiments, the total resin charge was 23 grams and 0.23 gram of stannic octoate (1.0 percent) was used. This was equivalent to 0.17 percent contained tin. An equivalent amount of stannic acetate, 0.12 gram, was also used.

It was also found that stannic octoate could be mixed with the epoxide at room temperature and cause the epoxide to homopolymerize with evolution of heat.

For example, to 50 grams of the epoxide at room temperature, was added 0.675 gram of stannic octoate (0.23 percent contained tin) and within 90 minutes the temperature of the mass reached 160° C. The resin after no additional heat-curing had a Barcol of 36. Thus, stannic octoate is unique in its ability to be mixed in with this epoxide, without causing gel particles to form around it, and yet cause the mass to homopolymerize with evolution of heat.

Also, mixtures of this same epoxide, when mixed with polyol and anhydride at room temperature, were exothermic. For example, a solution of 12.0 grams of maleic anhydride in 50 grams of the epoxide was mixed with 4.4 grams of hexanetriol and 1.0 gram of stannic octoate at 29° C. After 44 minutes, a peak exotherm of 218° C. was obtained. The resin after no additional heat-curing had a Barcol of 40.

EXAMPLES 19–28

The following examples demonstrate the effectiveness of the stannic acylate catalyst with various types of polyepoxides and an anhydride hardener. The catalyst was added to a homogeneous solution as before and the curing was performed at the temperature and for the periods indicated, the results being given in Table II.

*Table II*

| Ex. No. | Epoxide [a] | | Hardener [b] gms. | Stannic octoate Gms. | Gel time at °C. | 150° C. cure, Hrs. | Remarks |
|---|---|---|---|---|---|---|---|
| | No. | Gms. | | | | | |
| 19 | A | 11.7 | 11.3 | 0.23 | 3–10 hrs at 150° C | 10 | Rubbery resin. |
| 20 | A | 11.7 | 11.3 | | | 10 | Liquid at room temperature. |
| 21 | B | 10.1 | 12.9 | 0.23 | 0–1 min. at 27–150° C | 6 | |
| 22 | B | 10.1 | 12.9 | | | 6 | |
| 23 | C | 11 | 12 | 0.23 | | 6 | Paste at room temperature. |
| 24 | C | 11 | 12 | | | 6 | Liquid at room temperature. |
| 25 | D | 16.7 | 6.3 | 0.23 | 0–4 mins. at 27–150° C | 6 | |
| 26 | D | 16.7 | 6.3 | | | 6 | Liquid at room temperature. |
| 27 | E | 16.3 | 6.7 | 0.23 | 1.0–1.25 hrs. at 150° C | 6.5 | |
| 28 | E | 16.3 | 6.7 | | | 1.7–2.5 hrs. at 150° C | 6.5 | |

[a] Epoxide A=Bis(2,3-epoxycyclopentyl) ether. Epoxide B=Vinylcyclohexene dioxide. Epoxide C=Dicyclopentadiene dioxide. Epoxide D=Bis(3,4-epoxy-6-methylcyclohexylmethyl) adipate. Epoxide E=1,1,1-trimethylolpropane tris-(3,4-expoxy-cyclohexanecarboxylate).
[b] Methylbicyclo-[2.2.1] heptene-2,3-dicarboxylic anhydride was used.

EXAMPLES 29–30

The utility of stannic catalysts with epoxides of the cyclohexene oxide type as compared to glycidyl epoxides was demonstrated in the preparation of rigid epoxide foams by the following procedure.

Stannic octoate was dissolved in trichlorofluoromethane. This solution was added to a solution of the appropriate epoxide, tolylene diisocyanate (20%, 2,6- and 80% 2,4-isomers), and a silicone oil surfactant (siloxane-oxyalkylene copolymer). All materials were at a temperature of 28° C. before mixing. The resulting solution was then immediately added to a half-acid ester prepared by reacting the propylene oxide adduct of pentaerythritol (molecular weight 476) with excess maleic anhydride. The total charge in each case was 360 grams. The experiments are summarized in Table II.

In Example 29, using 3,4-epoxy-6-methylcyclohexylmethyl 3,4-epoxy-6-methylcyclohexanecarboxylate, the ingredients were mixed for 1.5 minutes, poured into a mold, and the rise was complete (6.5 inches) in 2.5 minutes, the time being measured from the instant all ingredients were blended together. A rigid foam having a density of 2.4 pounds per cubic foot was obtained. In Example 30, using the diglycidyl ether of bis(4-hydroxy-phenyl) propane, the materials were mixed for 4 minutes and poured into a mold. After standing for 20 hours, a rise of only 0.75 inch was noted and a sticky, soft foam obtained. The specific formulations used in Examples 29–30 are shown below in Table III.

*Table III. Comparison of epoxides in foam preparation [a]*

| Ex. No. | Epoxide | | Hardener [d] Wt., g. | Tolylene diisocyanate, Wt., g. | Fluoro-carbon, Wt., g. | Stannic octoate, Wt., g. | Surfactant Wt., g. |
|---|---|---|---|---|---|---|---|
| | Name | Wt., g. | | | | | |
| 29 | [b] | 193 | 91 | 22 | 47 | 1.8 | 3.6 |
| 30 | [c] | 208 | 79 | 19 | 47 | 1.8 | 4.1 |

[a] Foams made using ratio of epoxide: COOH:NCO equivalents of 1:0.3:0.2, 0.5 percent stannic octoate, 13 percent fluorocarbon and 1 percent surfactant (based on total weight of foam).
[b] 3,4-epoxy-6-methylcyclohexylmethyl 3,4-epoxy-6-methylcyclohexanecarboxylate.
[c] Diglycidyl ether of bis(4-hydroxyphenyl)propane.
[d] Half-acid ester prepared by reacting the propylene oxide adduct of pentaerythritol (mol. wt. 476) with exces maleic anhydride.

What is claimed is:

1. A curable composition comprising (1) an epoxide compound selected from the group consisting of epoxidized dicyclopentadiene, an alkylene di(epoxycyclohexane carboxylate), an epoxycyclohexylalkyl epoxycyclohexane carboxylate, an oxyalkylene glycol epoxycyclohexane carboxylate, an epoxycyclohexylalkyl aliphatic dicarboxylate, and an epoxycyclohexylalkyl phenylene dicarboxylate, and (2) a stannic salt of a carboxylic acid.

2. The composition of claim 1 wherein the said stannic salt is stannic octoate.

3. A curable composition comprising epoxidized dicyclopentadiene and a stannic salt of a carboxylic acid.

4. A curable composition comprising an alkylene di(epoxycyclohexane carboxylate) and a stannic salt of a carboxylic acid.

5. A curable composition comprising an epoxycyclohexylalkyl epoxycyclohexane carboxylate and the stannic salt of a carboxylic acid.

6. A curable composition comprising 3,4-epoxy-6-methylcyclohexylmethyl 3,4-epoxy-6-methylcyclohexane carboxylate and a stannic salt of a carboxylic acid.

7. A curable composition comprising an oxyalkylene glycol epoxycyclohexane carboxylate and a stannic salt of a carboxylic acid.

8. A curable composition comprising an epoxycyclohexylalkyl aliphatic dicarboxylate and a stannic salt of a carboxylic acid.

9. A curable composition comprising bis(3,4-epoxy-6-methylcyclohexylmethyl) adipate and a stannic salt of a carboxylic acid.

10. A curable composition comprising an epoxycyclohexylalkyl phenylene dicarboxylate and a stannic salt of a carboxylic acid.

11. A curable composition comprising (1) an epoxide compound selected from the group consisting of epoxidized dicyclopentadiene, an alkylene di(epoxycyclohexane carboxylate), and epoxycyclohexylalkyl epoxycyclohexane carboxylate, an oxyalkylene glycol epoxycyclohexane carboxylate, an epoxycyclohexylalkyl aliphatic dicarboxylate, and an epoxycyclohexylalkyl phenylene dicarboxylate, (2) a stannic salt of a carboxylic acid, and (3) an organic hardener selected from the group consisting of polyfunctional amines, polycarboxylic acids, polycarboxylic acid anhydrides, polyhydric phenols, polyhydric alcohols, polythiols, polyisocyanates, polyisothiocyanates, and polyacyl halides.

12. The curable composition of claim 11 wherein the organic hardener is a polymerized fatty acid having a molecular weight between 500 and 5000.

References Cited by the Examiner

UNITED STATES PATENTS

| 2,633,458 | 3/53 | Shokal. |
| 2,824,083 | 2/58 | Parry et al. |
| 2,917,491 | 12/59 | Phillips et al. _____ 260—2EP XR |
| 2,921,929 | 1/60 | Phillips et al. _____ 260—2EP XR |
| 2,970,983 | 2/61 | Newey. |

FOREIGN PATENTS

| 806,188 | 12/58 | Great Britain. |

WILLIAM H. SHORT, Primary Examiner.

MILTON STERMAN, PHILIP E. MANGAN, JOSEPH R. LIBERMAN, Examiners.